United States Patent [19]
Silver

[11] Patent Number: 6,144,986
[45] Date of Patent: Nov. 7, 2000

[54] SYSTEM FOR SORTING IN A MULTIPROCESSOR ENVIRONMENT

[75] Inventor: Paul S. Silver, Youngstown, Ohio

[73] Assignee: Cybersales, Inc., Youngstown, Ohio

[21] Appl. No.: 08/827,393

[22] Filed: Mar. 27, 1997

[51] Int. Cl.[7] .............................. G06F 15/16; H04L 12/28
[52] U.S. Cl. ............................................ 709/201; 370/411
[58] Field of Search ............................ 370/411; 864/243, 864/262.4, 243.4, 244, 246, 241.2; 395/200.31, 182.01, 182.04; 709/201

[56] References Cited

U.S. PATENT DOCUMENTS

| | | | |
|---|---|---|---|
| 4,064,556 | 12/1977 | Edelberg et al. ......................... | 364/900 |
| 4,161,036 | 7/1979 | Morris et al. ............................ | 364/900 |
| 4,425,617 | 1/1984 | Sherwood ................................ | 364/200 |
| 4,567,572 | 1/1986 | Morris et al. ............................ | 364/900 |
| 4,595,995 | 6/1986 | Alles ....................................... | 364/900 |
| 4,628,483 | 12/1986 | Nelson ..................................... | 364/900 |
| 4,727,474 | 2/1988 | Batcher ................................... | 364/200 |
| 4,734,877 | 3/1988 | Sakata et al. ........................... | 364/730 |
| 4,761,780 | 8/1988 | Bingham et al. ........................ | 370/60 |
| 4,799,152 | 1/1989 | Chuang .................................... | 364/200 |
| 4,905,224 | 2/1990 | Lobjinski et al. ........................ | 370/60 |
| 5,146,590 | 9/1992 | Lorie et al. .............................. | 395/600 |
| 5,179,699 | 1/1993 | Iyer et al. ................................ | 395/650 |
| 5,185,886 | 2/1993 | Edem et al. .............................. | 395/600 |
| 5,222,235 | 6/1993 | Hintz et al. .............................. | 395/600 |
| 5,287,466 | 2/1994 | Kodama ................................... | 395/375 |
| 5,307,485 | 4/1994 | Bordonaro et al. ...................... | 395/600 |
| 5,319,788 | 6/1994 | Canfield et al. ......................... | 395/800 |
| 5,392,279 | 2/1995 | Taniguchi ................................. | 370/60 |
| 5,513,371 | 4/1996 | Cypher et al. ........................... | 395/800 |
| 5,541,914 | 7/1996 | Krishnamoorthy et al. .............. | 370/56 |

OTHER PUBLICATIONS

Batcher, K.E., "Low-cost Flexible Simulation with the Static Perfect Shuffle Network", Fourth Symposium on the Frontiers of Massively Parallel Computation (Cat. No. 92CH3185-6); Oct. 19-21, 1992., IEEE; NASA; McLean, VA, 434-440, (1992).

Batcher, K.E., "Sorting Networks and their Applications", The Proceeding of AFIPS 1968 SJCC, 307-314, (1968).

Stone, H.S., "Parallel Processing with the Perfect Shuffle", *IEEE Transactions on Computers*, C-20(2), 153-161, (Feb. 1971).

Primary Examiner—Zarni Maung
Assistant Examiner—Tod Kupstas
Attorney, Agent, or Firm—Schwegman, Lundberg, Woessner & Kluth, P.A.

[57] ABSTRACT

An improved system for sorting a data set of $2^m$ keys in a parallel processor environment is disclosed. The system operatively maps a shuffle-exchange network onto a Batcher sorting network in order to produce a monotonically sorted output set. Complete and efficient sorting is achieved by shuffling a control mask applied to multiple compare-exchange elements when the data set is redundantly shuffled. A further improvement is achieved by employing an unshuffle operation to the data set and/or the control mask when the use of an unshuffle operation would be more expedient than use of a shuffle operation.

13 Claims, 4 Drawing Sheets

SYSTEM FOR SORTING IN A MULTIPROCESSOR ENVIRONMENT

COPYRIGHT

A portion of this disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

The present invention relates generally to sorting of a series of data items. More particularly, the present invention relates to an improved system for sorting of a set of data in a parallel processor, or multiprocessor, environment.

Sorting of data has presented one of the most significant and important problems in many fields including the field of computer science. Often arising as a component of a more general task such as organizing or searching, sorting problems have been ubiquitous. For example, it is frequently necessary in the business world to sort bills, to arrange mail by postal code or to maintain ordered databases. As other examples, efficient computer searching requires a sorted list, and computer operating systems require process lists sorted by run-times in order to provide efficient scheduling of tasks.

As a result, many computer algorithms have been proposed to efficiently sort sets of data elements. Some of these algorithms, such as the well known quick sort and merge sort, are designed to work in a sequential processor environment, in which sorting is performed by a single central processing unit (CPU). With the use of only one single processor at a time, those skilled in the art will recognize that the theoretical limit of complexity, or minimum number of required operations, that can be achieved in sorting n items using comparison-based sorting is on the order of $O(n\log_2 n)$. By the same token, the speed with which these algorithms are executed is also limited by the speed of the single CPU performing the work. Consequently, for sorting large sets of data, the sequential processing environment offers little utility.

A parallel processor (or multiprocessor) environment offers the ability to increase computing throughput so that large problems can be solved in a reasonable amount of time. Parallel processing thus offers the ability to more efficiently sort large sets of data. Generally speaking, two structures exist for enabling communication between processors in a parallel processor environment, message passing and shared memory. In a message passing structure, each CPU is associated with an independent memory, such as random access memory (RAM), and information is passed from processor to processor by hard wire connections between the processors. A message passing structure, which is a true network, thus generally requires specialized hardware, or is at least optimized for use in a specialized hardware environment. In contrast, in a shared memory structure, multiple CPUs are hard-wired through a bus to a single shared memory bank, and the processors read from and write to particular areas of that memory. Due to the substantial absence of specialized hard-wire connections between processors for optimal performance, the shared memory structure enables simpler, more efficient swapping of data and scaling of operations.

The present invention relates to a improved system for sorting a sequence of substantially $2^k$ randomly ordered "keys" or data elements in a parallel processing structure. In 1968, while working for Goodyear Aerospace Corporation, Kenneth E. Batcher first proposed a sorting network that employed a parallel processor structure. Batcher's network (which, for reference, may be referred to as a "Batcher network") was described in K. E. Batcher, "Sorting networks and their applications," *Spring Joint Computer Conference, AFIPS proceedings* vol 32, 1968 Washington, D.C.: Thompson, pp. 307–314. The Batcher sorting network was designed to monotonically sort a sequence of data of length $2^k$.

Batcher's original network was based on an arrangement of a compare-exchange (CE) modules that each received two inputs, A and B, and produced two outputs, L and H. The L output represented the minimum of inputs A and B, and the H output represented the maximum of inputs A and B. FIG. 1 illustrates the structure of a Batcher sorting network for a data set of 8 elements, as depicted in Harold S. Stone, "Parallel Processing with the Perfect Shuffle," *IEEE Transactions on Computers*, vol. C-20 number 2, February 1971 IEEE pp. 153–161. Batcher's network essentially operates by rearranging the data into "bitonic" form and then recursively reconstructing the data into a fully sorted monotonic set. As those of ordinary skill in the art will understand, a bitonic sequence is the juxtaposition of two monotonic sequences, one ascending and the other descending, even if the sequence is split anywhere and the two parts interchanged.

Batcher's network was based on a theory that if a bitonic sequence of 2n numbers, $a_1, a_2, \ldots a_{2n}$, is split into two sequences, $$\min(a_1, a_{n+1}), \min(a_2, a_{n+2}), \ldots \min(a_n, a_{2n}) \quad (1)$$

and $$\max(a_1, a_{n+1}), \max(a_2, a_{n+2}), \ldots \max(a_n, a_{2n}) \quad (2)$$

then each of these sequences is also bitonic and no number of (1) is greater than any number of (2). Based on this theory, Batcher determined that a bitonic sorting network for 2n numbers can be constructed from n CE elements and two bitonic sorters for n numbers. In turn, by using recursive construction, Batcher discovered that a number of such CE modules properly configured in a message passing structure could enable a given sized data set to be monotonically sorted.

As shown in FIG. 1, the Batcher sorting network employs a series of CE stages or ranks, where, at each stage, the data is placed in a specified permutation and then pairs of data elements are compared and exchanged in a predetermined fashion. By design, most of the CE modules in the Batcher network sort data low-to-high, so that the top output of the module is the low element L of the pair and the bottom output is the high element H of the pair. In order to achieve proper sorting, however, Batcher required certain of the CE modules to produce reversed outputs, where the top output was the high H of the pair, and the bottom output was the low L of the pair. For instance, in FIG. 1, the shaded CE modules represent the reversed CE outputs required by Batcher, whereas the unshaded modules represent ordinary low-to-high outputs.

To sort an array $A[0 \ldots N-1]$ of N keys in non-decreasing order, where $N=2^k$, Batcher's network could be implemented on any ideal parallel random access machine (PRAM) that uses a shared memory architecture. The PRAM would thus have N/2 processors each loaded with the algorithm and each identified by a processor ID (or "PID") ranging from 0 to N/2−1. An algorithm of this type may then appear, for instance, as follows:

TABLE 1

BATCHER'S BITONIC SORT

```
Bitonic Sort (A: Array; N: Integer)
Var rev, del, Q, R: Integer
   K1,K2: Key
   Rflag, Sflag: Boolean
Begin
   Rev: 2
   While rev ≦ N do
      If  2*PID/rev  is odd then Rflag := True
      Else Rflag := False
      Endif
      del := rev/2
      While del ≧ 1 do
         Q :=    PD/del  *del
         R := PID-Q
         K1 := A[2*Q + R]
         K2 := A[2*Q + R + del]
         Sflag := Rflag
         If K1 > K2 then Sflag := not Sflag
         End if
         If Sflag then swap K1 and K2
         End if
         A[2*Q + R] := K1
         A[2*Q + R + del] := K2
         del := del/2
      End {while del ≧ 1}
      rev := 2*rev
   End {while rev ≦ N}
End {Bitonic Sort}
```

In this algorithm, 2*Q+R and 2*Q+R+del represent the data movement that would occur if input to the physical Batcher sorting network is treated as an array. Thus, these terms describe the physical hard-wired connections of the Batcher sorting network. As those of ordinary skill in the art will appreciate, the foregoing algorithm works in part by cycling through permutations of the data in a specified sequence, and comparing and exchanging data elements where necessary in order to achieve a monotonically sorted output set.

Significantly, Batcher's bitonic sorting network required the entire sequence of numbers to pass through a total of $\frac{1}{2}(\log_2 N)^2$ stages or ranks of CE modules, giving Batcher's network an order of complexity, or worst-case efficiency, of $O(\log_2 N)^2$. Further, Batcher's network would require a total of $(p^2-p+4)p^{p-2}$ CE modules, where $N=2^p$ or $p=\log_2 N$. Additionally, Batcher's network theoretically required potentially a huge number of CPUs to be hard wired together in a predefined configuration for a given sized data set, or, alternatively, custom software to be developed for handling each sized data set. As a result, Batcher's network was impractical for sorting large data sets, because such a network would, at worst, require an exceptionally large number of processors hard wired in a configuration designed to sort and, at best, lead to cumbersome and inefficient simulation by software.

In 1971, Harold Stone described a new bitonic sorting network, the "shuffle-exchange network." Harold S. Stone, "Parallel Processing with the Perfect Shuffle," *IEEE Transactions on Computers,* vol. C-20 number 2, February 1971 IEEE pp. 153–161. The shuffle-exchange network was said to enable operation of the Batcher sorting algorithm while eliminating all but one of the CE module ranks described by Batcher. In particular, instead of requiring a set of data elements to pass through multiple hard-wired stages of compare-exchange modules, Stone developed a single network, called the "perfect shuffle," through which a set of data can be passed any number of times and by which the set of data could be shuffled into the necessary "Batcher" permutations before subjecting the data set to the comparison-exchanges required by Batcher.

Stone's system was designed to shuffle a set of data, similar to shuffling a deck of cards, in order to change the permutations of adjacent data elements. Further, Stone devised a control mask made of bits that would be input to the CE modules and would dictate whether the outputs of given CE modules would be ordered high-to-low, or low-to-high, so as to enable implementation of the bitonic sequencing required by the Batcher network. In this way, it became theoretically possible to fully execute the Batcher sorting algorithm without the necessity of passing through multiple hard-wired or custom designed stages, but rather with the use of a single generic shuffle-exchange network.

In an effort to maximize sorting efficiency, Stone's shuffle exchange network required a number of processors equal to at least the number of data items to be sorted. The shuffle exchange network then employed a "perfect shuffle" pattern, by which the outputs of each processor are connected to the inputs of specified processors. FIG. 2 depicts the shuffle-exchange network as illustrated by Stone. As shown in FIG. 2, those of ordinary skill in the art will appreciate that, for a data set $a_0, a_1, a_2, \ldots a_{N-1}$ bearing index numbers i=0, 1, 2, ... N−1, the perfect shuffle pattern defines the input p(i) of each processor as follows:

$$p(i) = 2i \qquad 0 \le (N/2) - 1$$

$$2i + 1 - N \quad (N/2) \le i \le (N-1)$$

By passing data items through the perfect shuffle, the items are thus shuffled like a deck of cards in order to enable subsequent comparisons of data elements to be made in different permutations. According to the shuffle-exchange network, between successive passes through Batcher's CE units, the data is shuffled one or more times by the perfect shuffle to obtain the required starting Batcher permutation on which one or more compare-exchanges are to be performed. Before a data set has been subjected to the shuffle-exchange network, each element or key in the set may be represented by an index number, such that in a set of 8 keys, for example, the keys are initially represented by the indexes 000, 001, 010, 011, 100, 101, 110, and 111. Stone recognized that each time a set of data items is passed through the perfect shuffle, the binary representations of the index numbers for each item are cyclically shifted once to the right. Thus, with a set of 8 numbers for instance, the index numbers shift as follows for successive passes through the perfect shuffle:

TABLE 2

INDEX NUMBER SHIFTS

| Decimal Index | Binary Index | After Pass 1 | After Pass 2 | After Pass 3 |
|---|---|---|---|---|
| 0 | 000 | 000 | 000 | 000 |
| 1 | 001 | 100 | 010 | 001 |
| 2 | 010 | 001 | 100 | 010 |
| 3 | 011 | 101 | 110 | 011 |
| 4 | 100 | 010 | 001 | 100 |
| 5 | 101 | 110 | 011 | 101 |
| 6 | 110 | 011 | 101 | 110 |
| 7 | 111 | 111 | 111 | 111 |

Noticeably, after the sequence of numbers passes through the perfect shuffle $\log_2 N$ times, the index numbers return to their initial positions. As a result, it can be shown that only $\log_2 N$ passes through the perfect shuffle are required in order to arrange the numbers in all necessary permutations, rather than $(\log_2 N)^2$ passes through each CE rank as required by Batcher. Thus, given a set of 8 numbers, a total of only 3 passes through the perfect shuffle are required in order to arrange the numbers in all permutations required by Batcher's network.

After successive passes through the perfect shuffle, each pair of index numbers differs by only one bit, representative of a decimal difference of $2^{n-m}$, where m represents the number of passes through the perfect shuffle. Thus, after successive passes through the perfect shuffle, the difference between index numbers of the elements in each pair changes according to the sequence $2^{n-1}, 2^{n-2}, \ldots 2^0$, where $n=\log_2 N$. Take, for instance, 8 data items of which the first two index number pairs are 0–1 and 2–3, or 000–001 and 010–011, as shown in Table 1. Before the data is passed through the perfect shuffle, each pair of index numbers differs by a decimal value of 1, which may be referred as "1-apart." After one pass through the perfect shuffle, the first two pairs become 0–4 and 1–5, or 000–100 and 001–101, so that the indexes differ by a decimal value of 4, which may be referred to as "4-apart." In turn, after a second pass, the indexes differ by a decimal value of 2, which may be referred to as "2-apart." Finally, after another pass through the perfect shuffle, the indexes in each pair again differ by the decimal value of 1 and are therefore again "1-apart."

From another perspective, after each pass through the perfect shuffle, the index numbers of the keys in each pair can be seen to differ in only one bit position. This bit position may be referred to as the "pivot bit" or as the "node number" of the processor network. Thus, before the first pass shown above, each respective index number pair differs in only the 1 pivot bit position (for instance, 010–011); after the first pass, the index number pairs differ in the 4 pivot bit position (for instance, 001–101); after the second pass, the index number pairs differ in the 2 pivot bit position (for instance, 100–110); and after the third pass, the index number pairs again differ in the 1 pivot bit position. Accordingly, at these stages, the pivot bits are respectively 1, 4, 2 and 1. A similar sequence of pivot bits can be derived for a data set of any length. For instance, for a data set of 16 numbers, the sequence of pivot bits would be 1, 8, 4, 2, 1. More generally, for a sequence of $2^k$ data elements, the corresponding sequence of pivot bits would be $2^0, 2^k, 2^{k-1}, 2^{k-2}, 2^{k-3}, \ldots 2^0$.

Stone further recognized that, as discussed above, Batcher's sorting network called for a sequence of comparison-exchanges in which the pivot bits of the data elements for each successive comparison follow the sequence $i_0, i_1, i_0, i_2, i_1, i_0, \ldots, i_{m-1}, i_{m-2}, \ldots, i_1, i_0$. Phrased differently, Batcher's network requires several subsequences of useful comparisons to be performed. The first subsequence calls for a $2^0$-apart permutation. The second subsequence calls for $2^1$-apart and then $2^0$-apart permutations, and the mth subsequence calls for permutations of $2^{m-1}$-apart, $2^{m-2}$-apart, . . . , $2^1$-apart, and $2^0$-apart. These subsequences thus must begin with starting permutations having index number differences, or pivot bits, of $2^0, 2^1, \ldots, 2^{m-2}$, and $2^{m-1}$.

In contrast, however, as established above, Stone's perfect shuffle gives rise to sequential index number differences of $2^{n-1}, 2^{n-2}, 2^{n-3}, \ldots, 2^0$, which is the reverse of the order required as starting permutations for Batcher's algorithm. Consequently, in order to map the shuffle-exchange-network onto Batcher's network, Stone recognized that it would be necessary at times to first perform a sequence of redundant shuffles in order to place the data in the appropriate permutation for performing each stage of the Batcher compare-exchange. These shuffles are referred to as "redundant," because the only purpose served by the shuffle is to rearrange the permutation in preparation for subjecting the data set to the compare-exchanges and shuffles required by each stage of the Batcher network. Only after performing any necessary redundant shuffles would the Stone network then perform the series of compare-exchanges required by Batcher. As one example, again assume an 8 element data set. In order to reach a pivot bit of 2 for the start of the second rank of Batcher's network, the data set would have to pass through Stone's perfect shuffle two extra times. Beginning with a pivot bit of 1 (which, as noted above, is the initial pivot bit of an unsorted set), the first pass through the perfect shuffle would change the pivot bit to 4, and the second pass would change the pivot bit to 2. According to Batcher, necessary comparison-exchanges may then be performed on each adjacent pair of data elements for the given rank.

Stone also recognized the above-discussed requirement in Batcher's sorting network to reverse the outputs from certain CE modules. Consequently, in addition to mapping the permutations required for the Batcher algorithm, as noted above, Stone also described a set of mask bits, or signal bits, each of which was to indicate whether a given CE module receiving the respective mask bit would produce outputs that were ordered high-to-low, or low-to-high. Specifically, supplying a mask bit of 0 to a CE module would result in a top output of L and a bottom output of H, whereas supplying a mask bit of 1 to a CE module would result in a top output of H and a bottom output of L. Theoretically, applying a set of appropriate mask bits (also referred to as a control mask) at each stage of the perfect shuffle would then provide the necessary reversal of compare-exchange outputs as required by Batcher's network.

In an effort to develop the appropriate mask bits for each stage of the Batcher sorting network, Stone drew upon the relationship between the pivot bits and the Batcher sorting stage. More particularly, as described above, the pivot bit is substantially unique to each stage in the shuffle-exchange network, and the data in each stage of the shuffle-exchange network may be mapped to the required permutation for Batcher's algorithm by performing a known number of redundant shuffles for that stage. Therefore, Stone theorized that the mask bits required for the sequential Batcher stages could be determined based on the pivot bit of the given stage. To this end, Stone developed the following sorting algorithm for the shuffle-exchange network:

TABLE 3

SHUFFLE-EXCHANGE ALGORITHM

COMMENT generate initial control mask in 1-apart position;
   R := vector (0, 1, 0, 1, . . . , 0, 1);
   mask := R;
   COMMENT m = $\log_2 N$;
   For i := 1 step 1 until m do
     Begin
       mask := mask $\oplus$ R;
       Shuffle(mask);
     End
COMMENT the array DATA contains the items to be sorted;
COMMENT perform compare-exchange on data in 1-apart position;
   Compare-Exchange(data)
COMMENT start remaining m-1 stages of sorting network;
COMMENT this may be referred to as the "control loop";
   For i = 1 step 1 until m-1 do TABLE 3-continued

SHUFFLE-EXCHANGE ALGORITHM

```
Begin
  COMMENT update mask --
  generate mask bits for next stage;
  Shuffle(R);
  mask := mask ⊕ R;
  COMMENT perform redundant shuffles
  to align data to next permutation;
  COMMENT this may be referred to as
  the "redundant-shuffle loop";
  For j := 1 step 1 until m-1-i do
    Shuffle(data);
  COMMENT perform next sequence of
  compare-exchange operations;
  COMMENT this may be referred to as
  the "compare-exchange loop"
  For j := m-1 step 1 until m do
    Begin
      Shuffle(data);
      Compare-Exchange(data);
    End;
End i loop
```

As those of ordinary skill in the art will understand from the foregoing, Stone's algorithm would theoretically operate by first generating a mask scaled to the size of the input data set, and, next for a specified number of repetitions, (i) updating the mask based on a control vector, (ii) performing any necessary redundant data shuffles to achieve the required permutation, and (iii) subjecting the data set to a specified number of shuffles and compare-exchange operations.

More particularly, Stone's algorithm would begin by developing a mask scaled to the size of the input data array, say $2^m$. The algorithm would generate this starting mask by first setting the mask equal to the string 0, 1, 0, 1, . . . , 0, 1 and then, for m repetitions, XORing the mask with control vector R=(0, 1, 0, 1, . . . , 0, 1) and shuffling the mask through the perfect shuffle. Using the resulting mask, Stone next performed a compare-exchange operation on the input data array set in the 1-apart permutation, that is, prior to shuffling the data set. In turn, for m repetitions, Stone would (i) update the mask by XORing it with a control vector, (ii) perform redundant shuffles on the data set, and (iii) subject the data to the shuffles and compare-exchanges required by Batcher. FIG. 3 sets forth a flow chart depicting these stages in Stone's algorithm.

With reference to the initial mask-generation loop of Stone's algorithm, by generating the initial mask dependent on the length of the data sequence being sorted, Stone's algorithm would further provide scalability. More particularly, by generating an initial mask based on the size of the data set, a rank of processors could in theory be reprogrammed in real time with the compare-exchange settings required to perform a Batcher sort, rather than hard-wiring the settings of the compare-exchange modules at construction time or simulating such a hard-wired environment through complex and inefficient software code. In this way, Stone believed the shuffle-exchange network could be used on any perfect shuffle network without modification. That is, Stone postulated that the shuffle-exchange network would enable any number of items to be sorted without requiring a custom-hardwired or custom-coded configuration.

In theory, Stone's perfect-shuffle-network thus provides the ability to obtain all possible permutations necessary to perform a Batcher sort. Further, as one of ordinary skill in the art would appreciate, the shuffle-exchange network would require substantially fewer processors to operate than Batcher's network. In addition, in Batcher's network, each stage requires N connections to communicate with the next stage, whereas the perfect-shuffle requires only 3 connections per processor to be fully connected. Assuming a construction cost C per connection, the cost for a Batcher network would then be $\frac{1}{2}CN(\log_2 N)^2$, whereas the cost for a shuffle-exchange network operating on the same number of data elements would be only 3CN. In view of these factors, as the size of the data set grows, the cost associated with the Batcher network will grow much faster than cost associated with the shuffle-exchange network.

In 1992, Batcher described an additional network called the "static-perfect-shuffle." K. E. Batcher, "Low-Cost Flexible Simulation with the Static Perfect Shuffle Network," *4th Symposium on the frontiers of Massively Parallel Computation,* Mclean Va., 1992 pp. 434–436. The static-perfect shuffle theoretically enables a perfect shuffle to be performed either forward or backward. That is, while the "perfect-shuffle" enabled shuffling of data giving rise to the sequence 1-apart, 2-apart, 4-apart and so on, Batcher envisioned an "unshuffle" operation that would reverse the shuffle sequence. The unshuffle operation would theoretically follow a path directly opposite of that illustrated in FIG. 2. Batcher did not, however, suggest any practical applications for his static-perfect-shuffle network. Further, it is believed that the "unshuffle" operation has not been extended to a data sorting network.

SUMMARY AND OBJECTS OF THE INVENTION

Notwithstanding the foregoing theoretical advantages of Stone's perfect shuffle network, the present inventor has determined that the perfect shuffle network, as presently known, will not work to monotonically sort a data set. As an example, and without limitation, if Stone's algorithm is applied to the eight element unsorted input array $A_{input}$=[8, 82, 77, 34, 92, 23, 19, 95], the resulting output array will be $A_{output}$=[8, 19, 23, 34, 77, 92, 82, 95]. A sample output data set corresponding to this analysis is set forth as Example 1 at the conclusion of this specification. Notably, in this output set, the number 82 is out of place. Consequently, the resulting array is not a proper monotonic sequence, contrary to Stone's hypothesis.

Therefore, there is a need for an operative and more efficient system of sorting in a parallel processor or multi-thread environment. In this regard, an object of the present invention is to provide an improved system for sorting a large number of data items, preferably exceeding 10,000, in a parallel processor environment. Further, an object of the present invention is to provide a software based system for sorting data sets of substantially any size without dependence on hardware configurations or custom designed code.

The present inventor has discovered that the foregoing objects may be achieved by routinely shuffling the mask bits of Stone's shuffle-exchange network each time the current data array is redundantly shuffled in preparation for the various ranks of the Batcher network. In a further aspect, efficiency of sorting may be enhanced by selectively applying an unshuffle operation at times rather than a shuffle operation, in order to decrease the number of data move operations and thereby decrease the processing time consumed by increasingly large data sets.

These, as well as other objects and features of the present invention are discussed or apparent in the following detailed description.

BRIEF DESCRIPTION OF THE DRAWINGS

Preferred embodiments of the present invention are described herein with reference to the drawings wherein.

DETAILED DESCRIPTION OF THE PREFERRED EMBODIMENT

Figure 1:
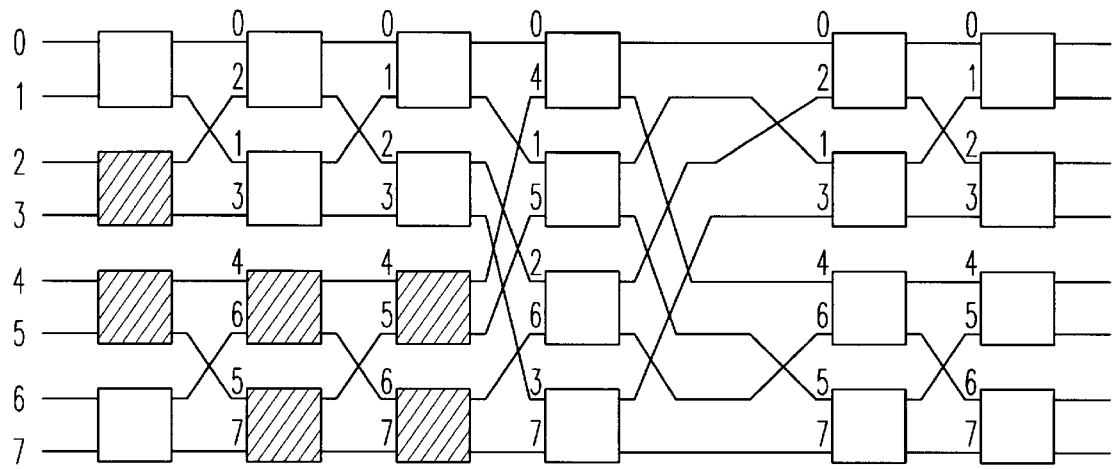
FIG. 1 is a diagram of the Batcher's prior art sorting network.
Figure 2:
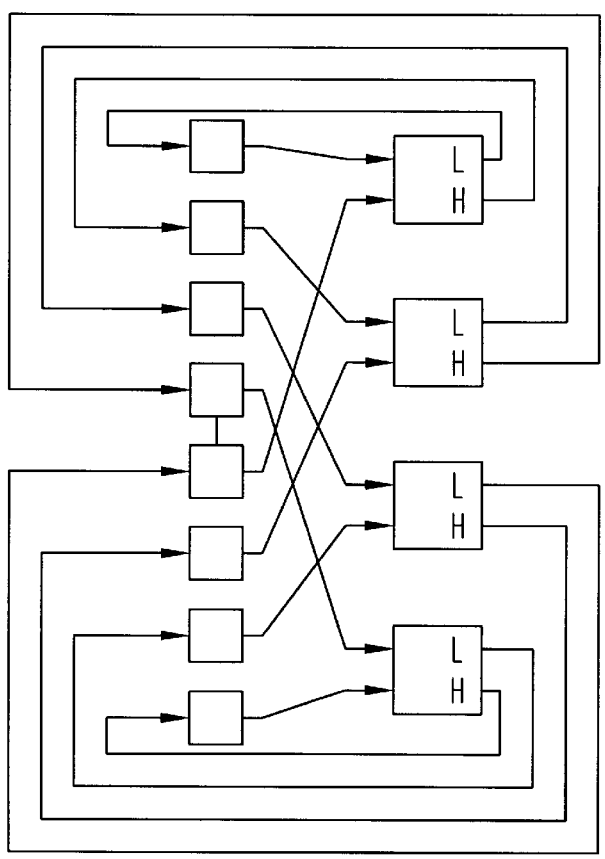
FIG. 2 is a diagram of Stone's prior art perfect-shuffle network.
Figure 3:
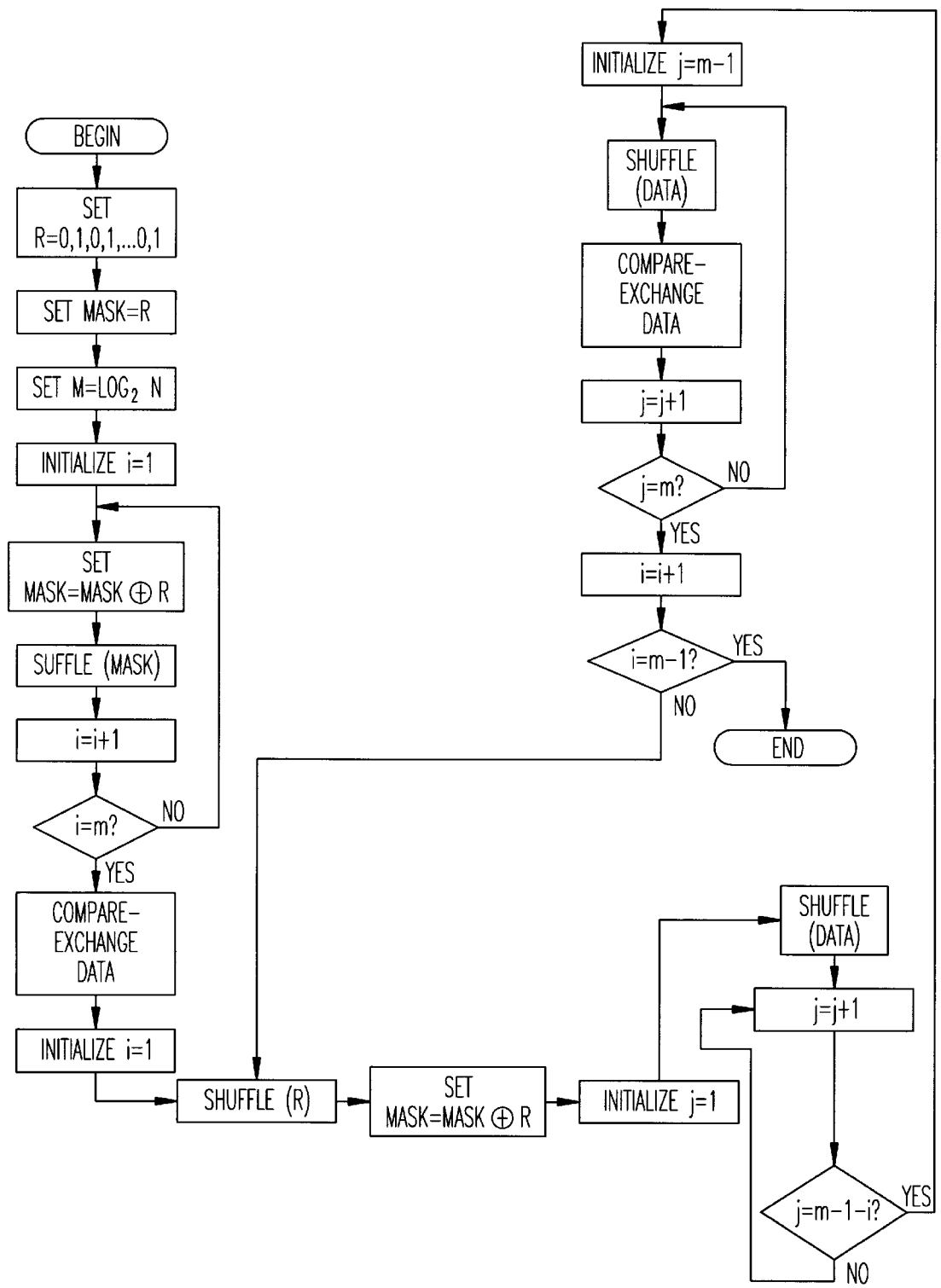
FIG. 3 is a flow chart illustrating the steps performed by Stone's prior art perfect-shuffle network.
Figure 4:
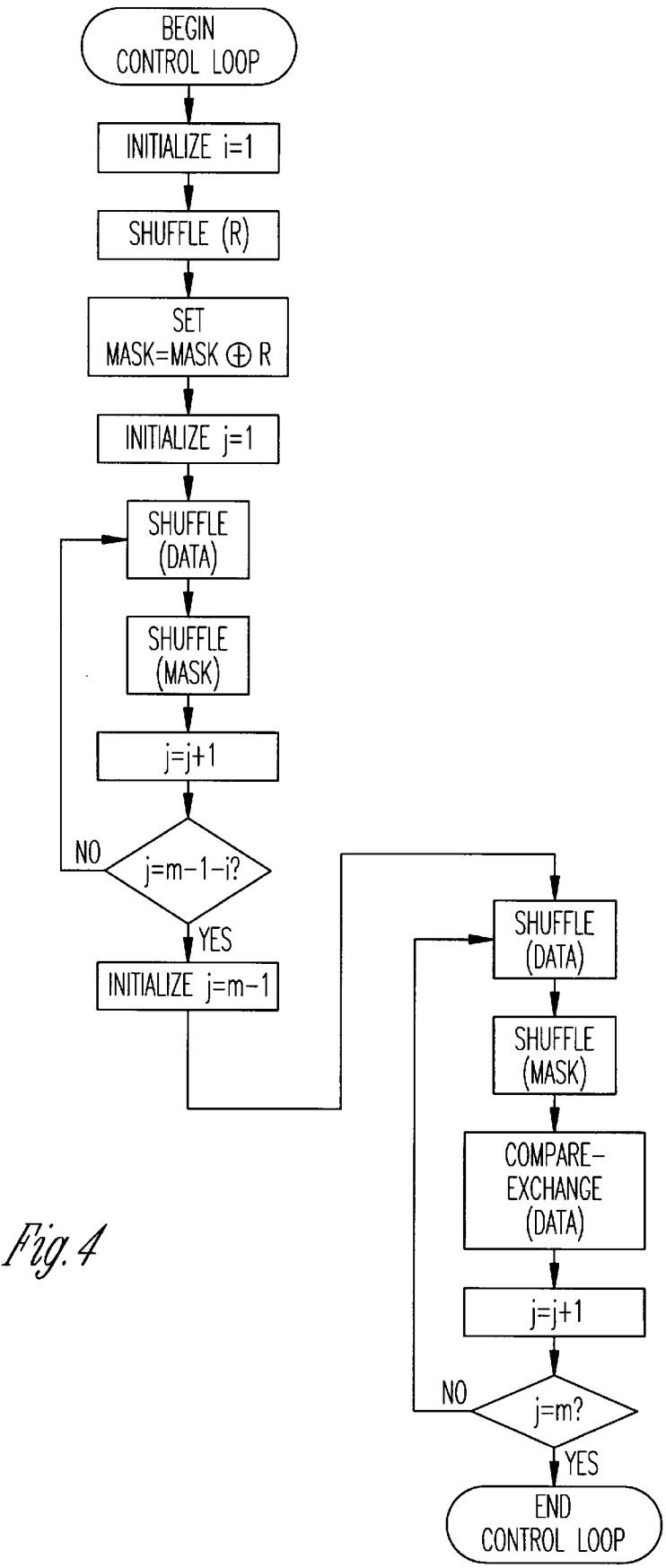
FIG. 4 is a flow chart illustrating the steps performed by a preferred embodiment of the present invention.

Referring to FIG. 4, a preferred embodiment of the present invention is shown as an improved system for sorting in a multiprocessor environment. The inventor has discovered that the algorithm underlying the existing shuffle-exchange network is deficient, in part because the algorithm fails to adjust the mask at each shuffle stage, particularly at each redundant shuffle stage. More specifically, referring to the code listed-above in Table 3 and the flow chart set forth as FIG. 3, the existing shuffle-exchange network generates the mask bits in the outer loop (or major pass) only and does not regenerate the mask bits at each inside loop, where each redundant data shuffle is performed. By failing to adjust the mask bits at stages including the redundant shuffle stages, Batcher's compare-exchange elements will not always produce the correctly ordered output, and the sequence will ultimately not be properly sorted.

As described above, in order to achieve a monotonic sequence, Batcher's network calls for moving gradually from a random list to a bitonic sequence to a monotonic sequence. In doing so, the starting pivot bits for sequential stages of the Batcher network are $2^0, 2^1, \ldots, 2^{m-2}$, and $2^{m-1}$. That is, the data starts in a 1-apart permutation and must be rearranged into a 2-apart permutation for the second Batcher rank, a 4-apart permutation for the third Batcher rank, and so forth. The existing shuffle-exchange network properly shuffles the data elements to obtain these permutations required by Batcher's network. Nevertheless, the existing shuffle-exchange network fails to produce monotonically ordered output.

The inventor has discovered the reason for the inoperability of the existing shuffle-exchange network and has devised a solution to this problem. In particular, the inventor has discovered that, although the shuffle-exchange network properly shuffles the data set at each iteration leading to the Batcher compare-exchange loop, the network fails to also regularly shuffle the control mask, particularly when the data set is subjected to a redundant shuffle. As a result, the control mask becomes out of synch with the data set, and the sort fails.

By definition, in the shuffle-exchange network, both the mask bits and the data bits start in a 1-apart permutation at the beginning of each iteration of the control loop. With reference to the pseudo code set forth in Table 3, however, the inventor has determined that the existing shuffle-exchange network erroneously leaves the control mask in this 1-apart permutation, rather than forcing the control mask to the same permutation as the data set. Thus, although the existing network properly XORs the control mask with the control array R during each iteration of the control loop, the network fails to properly shuffle the control mask in each iteration. Consequently, the inventor has determined that, because the permutation of the mask bits does not correspond exactly to the permutation of the data elements at each stage, proper monotonic sorting will not occur.

To force the mask and data set agree at every stage of the sort, and to thereby achieve proper monotonic sorting, the present invention calls for shuffling the mask bits every time the data is shuffled in preparation for the Batcher compare-exchange loop particularly when the data is redundantly shuffled. In this way, contrasted with the existing compare-exchange loop of the shuffle-exchange network, a preferred embodiment of the present invention may be expressed in pseudo code as follows, and as depicted in the flow chart of FIG. 4:

TABLE 4

COMPLETE MASK SHUFFLING

COMMENT start remaining m-1 stages of sorting network;
COMMENT this is the "control loop";
For i = 1 step 1 until m-1 do
  Begin
    COMMENT update mask --
    generate mask bits for next stage;
    Shuffle(R);
    mask := mask $\oplus$ R;
    COMMENT perform redundant shuffles
    to align data to next permutation;
    COMMENT this is the "redundant-shuffle loop";
    For j := 1 step 1 until m-1-i do
      Begin
        Shuffle(data);
        Shuffle(mask);
      End;
    COMMENT perform next sequence of
    compare-exchange operations;
    COMMENT this is the "compare-exchange loop";
    For j := m-1 step 1 until m do
      Begin
        Shuffle(data);
        Shuffle(mask);
        Compare-Exchange(data);
      End;
End i loop.

In addition, it has been discovered that enhanced sorting efficiency in a parallel processing environment can be achieved by selectively employing an unshuffle operation in the context of the presently improved version of the shuffle-exchange network. Specifically, it can be shown that a full one half of all shuffling operations in the existing shuffle-exchange network are the above-described redundant shuffles. As explained above, these redundant shuffles are used to map the perfect-shuffle onto Batcher's sorting network, by repeatedly shuffling the data to achieve the starting permutation required for a given rank of Batcher's network. For instance, with a data set of 8 elements, if the required starting permutation for a given rank of Batcher's network is a 2-apart, and the last operation in the shuffle-exchange network left the data in a 1-apart permutation, then two redundant shuffles would be required. The first redundant shuffle would rearrange the data into a 4-apart permutation, and the second redundant shuffle would rearrange the data into the required starting 1-apart permutation.

By selectively employing both the forward shuffle operation and the reverse shuffle operation, it has been determined that sorting may be achieved with substantially fewer data move operations than the existing network. Using the above example, for instance, a single unshuffle operation would work to rearrange the data set from its current 1-apart permutation into the required 2-apart permutation for the start of the next Batcher stage. Thus, rather than having to perform two forward shuffle operations, the data can be appropriately rearranged with only a single reverse shuffle, or unshuffle, operation. Of course, those skilled in the art will appreciate that, as the size of the data set increases, the number of redundant shuffles needed to map the perfect-shuffle (or shuffle-exchange network) onto Batcher's network also increases. In turn, selectively unshuffling as contemplated by this improvement will substantially reduce the total number of operations required to sort the data as the size of the data set increases. Additionally, it will be understood by those skilled in the art that the same unshuffling operation may be applied to the control mask as is applied to the data elements, in order to achieve the operative sorting network of the present invention.

In particular, it has been has determined that a full ½ of all redundant shuffles—or a full ¼ of all shuffles—may be eliminated by selectively employing either a forward shuffle or a reverse shuffle, whichever would more quickly (i.e., with fewer operations) reach the required starting permutation for the next stage of Batcher's network. Consequently, the total number of data move operations required to sort data sets of varying sizes may be reduced significantly by selectively reverse shuffling, as the following table of analytical data illustrates:

TABLE 5

SAVINGS IN DATA MOVES

| Array Size (N) | Data Move Operations in Existing Shuffle-Exchange Network | Data Move Operations Using the Network with Selective Reverse Shuffle | Number of Operations Saved |
| --- | --- | --- | --- |
| 8 | 17 | 17 | 0 |
| 16 | 31 | 31 | 0 |
| 32 | 49 | 47 | 2 |
| 64 | 71 | 67 | 4 |
| 128 | 97 | 89 | 8 |
| 256 | 127 | 115 | 12 |
| 512 | 161 | 143 | 18 |
| 1024 | 199 | 175 | 24 |
| 2048 | 241 | 209 | 32 |
| 4096 | 287 | 247 | 40 |
| 8192 | 337 | 287 | 50 |
| 16384 | 391 | 331 | 60 |
| 32768 | 449 | 377 | 72 |
| 655356 | 511 | 427 | 84 |
| ... | ... | ... | ... |

Those of ordinary skill in the art will understand from the foregoing that, as N becomes large, the total savings in data-moves provided by the network increases significantly. Indeed, it has been determined that, in a multiple processor environment, the theoretical time savings provided by the present invention is approximately $(N-\log_2 N)+12\%(N-\log_2 N)$, which provides approximately an 8% complexity savings compared to the quick sort or merge sort operations of a sequential processor.

Figure 5:
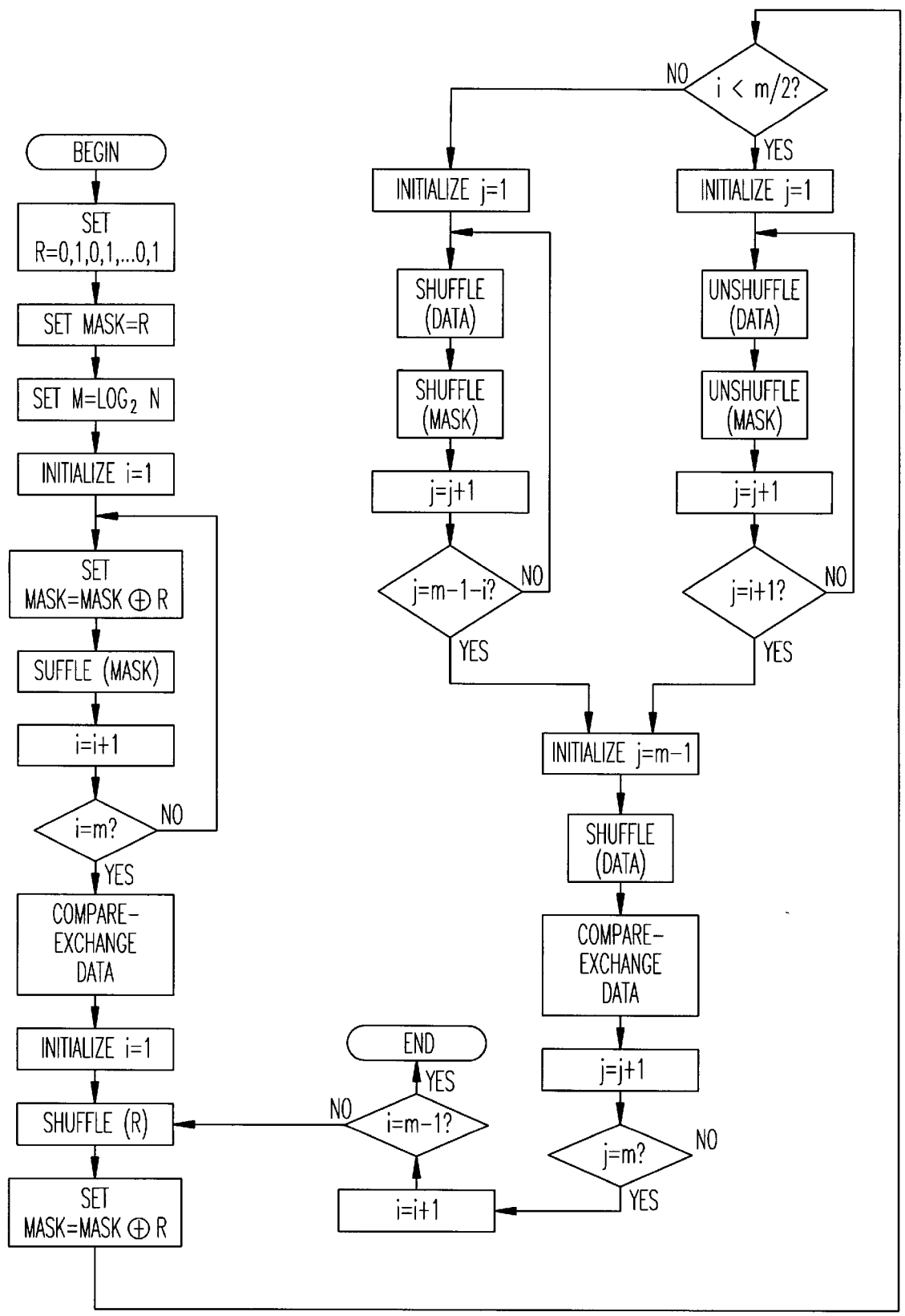
FIG. 5 is a flow chart illustrating the steps performed by an alternative improvement.

Thus employing, in combination, regular shuffling of the mask bits and selective, efficient use of the unshuffle operation, an improved sorting network may be achieved. An algorithm carrying out a sort in this improved network may be phrased in pseudo-code as follows, and as depicted by the flow chart set forth in FIG. 5:

TABLE 6

PSEUDO CODE OF IMPROVED ALGORITHM

```
COMMENT generate initial control mask in 1-apart position;
    R := vector (0, 1, 0, 1, . . . , 0, 1);
    mask := R;
    COMMENT m = log₂N;
    For i := 1 step 1 until m do
        Begin
            mask:= mask ⊕ R;
            Shuffle(mask);
        End
COMMENT the array DATA contains the items to be sorted;
COMMENT perform compare-exchange on data in 1-apart position;
    Compare-Exchange(data)
COMMENT start remaining m-1 stages of sorting network;
    For i = 1 step 1 until m-1 do
        Begin
            COMMENT update mask --
            generate mask bits for next stage;
            Shuffle(R);
            mask := mask ⊕ R;
            COMMENT align data to next permutation;
            If i<(m/2) then
                Begin
                    For j := 1 step 1 until i + 1 do
                        Begin
                            Unshuffle(data);
                            Unshuffle(mask);
                        End
                End
            Else
            Begin
                COMMENT perform redundant shuffles
                to align data to next permutation;
                For j := 1 step 1 until m-1-i do
                    Begin
                        Shuffle(data);
                        Shuffle(mask);
                    End;
            End If
            COMMENT perform next sequence of
            compare-exchange operations;
            For j := m-1 step 1 until m do
                Begin
                    Shuffle(mask);
                    Shuffle(data);
                    Compare-Exchange(data);
                End;
        End i loop.
```

More particularly, this improvement may be written in C++ in the following form, which may be compiled by a standard C++ compiler and executed by a Microsoft Windows 95 or Windows NT operating system:

TABLE 6

SAMPLE C++ EMBODIMENT

```
/*
* Stone's Bitonic Sort
*
* Sample implementation of improved sorting algorithm
*
* © Paul Silver 1996
*/
#include <stdio.h>
#include <stdiib.h>
#include <math.h>
void shuffle(int n, int *mask);
void unshuffle(int n,int *mask);
void xor(int n, int *mask, int *r);
void compareExchange(int n, int *mask, int *array);
void swap(int *x, int *y);
void print(char *message, int n, int *array);
void main (void)
{
int i,j, k,n,m;
int *r, *mask, *data;
printf("Enter the size of the Sorting Network\n");
scanf("%d", &n);
getchar();
m = (int)log2((float)n);
data = (int *) calloc(n, sizeof(int));
    r = (int *) calloc(n, sizeof(int));
mask = (int *) calloc(n, sizeof(int));
        srand((int)time(NULL));
        for (i = 0; i < n; i++)
            data[i] = rand()%100;
print("The unsorted list:",n, data);
/* compute the initial value of the mask: */
for (i = 0; i < n; i++)
    if (i%2)
            r[i] = mask[i] = 1;
    else
            r[i] = mask[i] = 0;
    print("initial r:",n, r);
    print("initial mask:",n, mask);
    printf("\nStarting mask formation loop . . . \n");
    for (i = 1; i <= m; i++)
        {
          xor(n, mask, r);
          shuffle(n, mask);
          printf("i = %d\n",i);
          print("Mask is now:",n,mask);
        }
    separator();
    print("Data before first compare-exchange:",n,data);
    compareExchange(n, mask, data);
    print("Data after first compare exchange:",n, data);
    separator();
    printf("Entering i loop of main sort\n");
    for(i = 1; i < = m-1; i++)
        {
          shuffle(n, r);
          xor(n, mask, r);
          separator();
          printf("i = %d\n",i);
          print("Mask is now:",n, mask);
          print("Data is now:",n, data);
          printf("\nBeginning redundant aligning shuffles . . . \n");
          for (j = 1; j <= m-1-i; j++)
            {
              printf("j = *d\n",j);
              shuffle(n, data);
              shuffle(n,mask);
              print("The shuffled data:",n, data);
              print("The shuffled mask:",n, mask);
            }
          printf("\nRedundant shuffles concluded, beginning inner j-loop . . . \n");
          for (k = m-i; k <= m; k++)
            {
              printf("j = %d\n",k);
              shuffle(n, mask);
              shuffle(n, data);
              print("The data before compare-exchange:",n, data);
```

TABLE 6-continued

SAMPLE C++ EMBODIMENT

```
                print("The mask before compare-exchange:",n, mask);
                compareExchange(n, mask, data);
                print("Data after compare-exchange:",n, data);
                }
        }
    separator();
    print("The sorted list:",n, data);
}
void separator(void)
{
printf("=====================\n");
}
void print(char *message, int n, int *array)
{
    int i;
    printf("%s\n",message);
    for (i = 0; i < n; i++)
        printf("%d", array[i]);
    printf(" ");
}
void shuffle(int n, int *mask)
{
int i, k = n/2 −−1, *tmpmask = (int *) calloc(n, sizeof(int));
for (i = 0; i < n; i++)
    tmpmask[i] = mask[i];
for (i = 0; i < n; i++)
    if(i <= k)
        mask[2*i] = tmpmask[i];
    else
        mask[2*i + 1 − n] = tmpmask[i];
free(tmpmask);
}
void unshuffle(int n*, int *mask)
{
int i, k = n/2 − 1, *tmpmask = (int *) calloc(n,sizeof(int));
for (i = 0; i < n; i++)
    tmpmask[i] = mask[i];
for (i = 0; i < n; i++)
    if (i <= k)
        mask[i] = tmpmask[2*i];
    else
        mask[i] = tmpmask[2*i + 1 − n];
free(tmpmask);
}
void xor(int n, int *mask, int *r)
{
int i;
for (i = 0; i < n; i++)
    if(mask[i] ==r[i])
        mask[i] = 0;
    else
        mask[i] = 1;
}
void swap(int *X, int *y)
{
int tmp;
tmp = *x;
*x = *y;
*y = tmp;
}
void compareExchange(int n, int *mask, int *array)
{
int tmp, i;
for (i = 0; i < n; i += 2)
    if (mask[i] && (array[i] < array[i + 1]))
        swap(&(array[i]), &(array[i + 1]));
    else
        if((mask[i] = 0) && (array[i] > array[i + 1]))
            swap(&(array[i]), &(array[i + 1]));
}
```

A sample set of output data generated by this C++ code is set forth in Example 2 at the conclusion of this specification.

In the preferred embodiment, the present invention is implemented as software or firmware (or other form of machine language instructions executable by a processor) with a series of "virtual" CPUs mapped onto threads of an operating system such as Windows NT, Solaris, Linux, Mach, OSF-1, Indigo, Irix and OS/2. In this configuration, each Batcher compare-exchange module may be carried out as a separate thread, within a shared memory structure. Alternatively, the present invention can be implemented on a CPU machine configured in a shared memory structure, such as a series of CPUs arranged in a parallel configuration with a memory shared through a common bus or in any of a variety of other processor configurations now known or that may become known to those of ordinary skill in the art. For reference, any such configuration, including but not limited to a multi-thread parallel processor or a hard wired multi-CPU parallel processor may generally be referred to as a "parallel processor," since the configuration has operative units (such as individual CPUs or individual "threads") that may simultaneously perform multiple data operations and that share a common memory.

As the foregoing illustrates, the improved sorting network not only provides an operative system for sorting any sized data set in a parallel processing structure, but also enhances the efficiency of the sort by substantially reducing the total number of operations required. Consequently, it is believed the improvement would beneficially decrease processing time involved with a variety of matters. As an illustrative list of examples, without limitation, the network would increase sorting efficiency and decrease processing time involved with sorting airplane schedules for air-traffic control, nationwide audits performed by the U.S. Internal Revenue Service, mass mailings including zip coding and addressing, credit card company postal zip coding, credit card company sorting of new accounts and delinquency, weather forecasting, as well as any other application involving frequent sorting of large amounts of data.

EXAMPLES

As described above, the following two Examples respectively illustrate sorts of data sets in the prior art sorting network and in the improvement of the present invention. As indicated above, the prior art sorting network requires more data moves than the improved sorting network. Additionally, as indicated above, the prior art sorting network fails to properly sort the input array in monotonic sequence. In contrast, the output of the present sorting network is a proper monotonic sequence.

Example 1
Prior Art Sorting network

Enter the size of the Sorting Network
The unsorted list:
8 82 77 34 92 23 19 95
initial r:
0 1 0 1 0 1 0 1
initial mask:
0 1 0 1 0 1 0 1
Starting mask formation loop . . .
i = 1
Mask is now:
0 0 0 0 0 0 0 0
i = 2
Mask is now:
0 0 1 1 0 0 1 1
i = 3
Mask is now:
0 0 1 1 1 1 0 0
Data before first compare-exchange:
8 82 77 34 92 23 19 95
Data after first compare exchange:
8 82 77 34 92 23 19 95
Enteringi loop of main sort -continued Example 1
Prior Art Sorting network i = 1
mask is now:
0 0 0 0 1 1 1 1
Data is now:
8 82 77 34 92 23 19 95
Beginning redundant aligning shuffles . . .
j = 1
The shuffled data:
8 92 82 23 77 19 34 95
The mask:
0 0 0 0 1 1 1 1
Redundant shuffles concluded, beginning inner j-loop . . . /nj = 2
The data before compare-exchange:
8 77 92 19 82 34 23 95
The mask before compare-exchange:
0 0 0 0 1 1 1 1
Data after compare-exchange:
8 77 19 92 82 34 95 23
j = 3
The data before compare-exchange:
8 82 77 34 19 95 92 23
The mask before compare-exchange:
0 0 0 0 1 1 1 1
Data after compare-exchange:
8 82 34 77 95 19 92 23
i = 2
Mask is now:
0 0 0 0 0 0 0 0
Data is now:
8 82 34 77 95 19 92 23
Beginning redundant aligning shuffles . . .
Redundant shuffles concluded, beginning inner j-loop . . ./nj = 1
The data before compare-exchange:
8 95 82 19 34 92 77 23
The mask before compare-exchange:
0 0 0 0 0 0 0 0
Data after compare-exchange:
8 95 19 82 34 92 23 77
j = 2
The data before compare-exchange:
8 34 95 92 19 23 82 77
The mask before compare-exchange:
0 0 0 0 0 0 0 0
Data after compare-exchange:
8 34 92 95 19 23 77 82
j = 3
The data before compare-exchange:
8 19 34 23 92 77 95 82
The mask before compare-exchange:
0 0 0 0 0 0 0 0
Data after compare-exchange:
8 19 23 34 77 92 82 95
The "sorted" list:
8 19 23 34 77 92 82 95

Example 2
Improved Sorting Network

Enter the size of the Sorting Network
The unsorted list:
51 76 5 81 63 9 3 32
initial r:
0 1 0 1 0 1 0 1
initial mask:
0 1 0 1 0 1 0 1
Starting mask formation loop . . .
i = 1
Mask is now:
0 0 0 0 0 0 0 0
i = 2
Mask is now:

Example 2
Improved Sorting Network

```
0 0 1 1 0 0 1 1
i = 3
Mask is now:
0 0 1 1 1 1 0 0
Data before first compare-exchange:
51 76 5 81 63 9 3 32
Data after first compare exchange:
51 76 81 5 63 9 3 32
Entering i loop of main sort
i = 1
Mask is now:
0 0 0 0 1 1 1 1
Data is now:
51 76 81 5 63 9 3 32
Beginning redundant aligning shuffles . . .
j = 1
The shuffled data:
51 63 76 9 81 3 5 32
The shuffled mask:
0 1 0 1 0 1 0 1
Redundant shuffles concluded, beginning inner j-loop . . . /nj = 2
The data before compare-exchange:
51 81 63 3 76 5 9 32
The mask before compare-exchange:
0 0 1 1 0 0 1 1
Data after compare-exchange:
51 81 63 3 5 76 32 9
j = 3
The data before compare-exchange:
51 5 81 76 63 32 3 9
The mask before compare-exchange:
0 0 0 0 1 1 1 1
Data after compare-exchange:
5 51 76 81 63 32 9 3
i = 2
Mask is now:
0 0 0 0 0 0 0 0
Data is now:
5 51 76 81 63 32 9 3
Beginning redundant aligning shuffles . . .
Redundant shuffles concluded, beginning inner j-loop . . . /nj = 1
The data before compare-exhchange:
5 63 51 32 76 9 81 3
The mask before compare-exchange:
0 0 0 0 0 0 0 0
Data after compare-exchange:
5 63 32 51 9 76 3 81
j = 2
The data before compare-exchange:
5 9 63 76 32 3 51 81
The mask before compare-exchange:
0 0 0 0 0 0 0 0
Data after compare-exchange:
5 9 63 76 3 32 51 81
j = 3
The data before compare-exchange:
5 3 9 32 63 51 76 81
The mask before compare-exchange:
0 0 0 0 0 0 0 0
Data after compare-exchange:
3 5 9 32 51 63 76 81
The sorted list:
3 5 9 32 51 63 76 81
```

A preferred embodiment of the present invention has been described above. Those skilled in the art will understand, however, that changes and modifications may be made in this embodiment without departing from the true scope and spirit of the present invention, which is defined by the following claims.

I claim:

1. In a sorting network of the type employing a parallel processor configured to sort a set of data elements by mapping a shuffle-exchange network onto a Batcher network, said sorting network employing a control mask including a set of mask bits indicative of whether or not to exchange given pairs of said data elements, and said sorting network employing a number of redundant shuffle operations to obtain permutations of said data elements as required by said Batcher sorting network, the improvement comprising shuffling said control mask each time a redundant shuffle operation is performed on said data elements.

2. A method for sorting a data set of $2^m$ keys in a parallel processing structure, wherein m is a nonzero positive integer, said parallel processing structure comprising, in combination, a computer system having operative units configured to simultaneously perform a plurality of data operations, and a memory shared by each of said operative units, said method comprising:

(a) generating a control mask having a plurality of mask bits indicating whether to exchange said keys in each of a plurality of pairs of said keys;

(b) applying a compare-exchange operation to each pair of said keys in a 1-apart permutation, to exchange said keys in each pair to the extent indicated by said mask bits;

(c) updating said control mask;

(d) for a first number of repetitions:
  (i) redundantly shuffling said keys, and
  (ii) redundantly shuffling said control mask; and (e) for a second number of repetitions:
  (i) shuffling said keys,
  (ii) shuffling said control mask, and
  (iii) applying said compare-exchange operation to a plurality of pairs of said keys, to exchange said keys in each pair as indicated by said mask bits.

3. A method as claimed in claim 2, wherein generating a control mask comprises:

(i) initiating a control vector equal to 0, 1, 0, 1, . . . , 0, 1, (ii) initiating a control mask equal to 0, 1, 0, 1, . . . , 0, 1, and (iii) for m repetitions, modifying said control mask by XORing said control mask with said control vector and shuffling said control mask.

4. A method as claimed in claim 3, wherein updating said mask comprises:

(i) shuffling said control vector; and (ii) XORing said control mask with said control vector.

5. A method as claimed in claim 2, wherein steps (c), (d) and (e) are repeated x times, where x=m−1.

6. A method as claimed in claim 5, wherein said first number of repetitions ranges from 1 to m−1−i repetitions, wherein i=x.

7. A method as claimed in claim 5, wherein said second number of repetitions ranges from m−1 to m repetitions.

8. A method for sorting a data set of $2^m$ keys in a parallel processing structure, said parallel processing structure comprising, in combination, a computer system having operative units configured to simultaneously perform a plurality of data operations, and a memory shared by each of said operative units, said method comprising:

(i) generating a control mask having a plurality of mask bits that indicate whether to exchange said keys in each of a plurality of pairs of said keys:

(a) initiating a control vector equal to 0, 1, 0, 1, . . . , 0, 1, (b) initiating a control mask equal to 0, 1, 0, 1, . . . , 0, 1, and (c) for m repetitions, modifying said control mask by XORing said control mask with said control vector and shuffling said control mask;

(ii) applying a compare-exchange operation to each pair of said keys to exchange said keys in each pair as indicated by said mask bits; and (iii) performing the following for m−1 repetitions, each repetition defining a repetition number x:
  (a) shuffling said control vector,
  (b) modifying said control mask by XORing said control mask with said control vector,
  (c) for m−1−x repetitions, shuffling said keys and shuffling said control mask, and
  (d) for two repetitions, shuffling said keys, shuffling said control mask, and applying a compare-exchange operation to said keys.

9. A system for sorting a set of data elements, said system comprising, in combination,
  a parallel processor having operative units configured to simultaneously perform a plurality of data operations;
  a memory shared by each of said operative units;
  a control mask comprising a set of mask bits indicating whether to exchange said data elements in each of a plurality of pairs of said data elements; and
  a shuffle routine stored in said memory and executable by said parallel processor, said shuffle routine redundantly shuffling said data elements a number of times and redundantly shuffling said mask bits each time said data elements are redundantly shuffled.

10. An apparatus for sorting data set of $2^m$ keys, said apparatus comprising:
  a parallel processing structure having a shared memory structure including a memory for storing a set of machine language instructions executable by said parallel processor;
  a control mask generation routine stored in said memory and executable by said microprocessor, for generating a control mask having a plurality of mask bits indicating whether to exchange said keys in each of a plurality of pairs of said keys; and
  a redundant shuffle routine stored in said memory and executable by said parallel processing structure, for redundantly shuffling said keys a number of times and for redundantly shuffling said mask bits each time said keys are redundantly shuffled.

11. An apparatus for sorting a data set of $2^m$ keys, comprising:
  (i) a parallel processor having a shared memory structure including a memory for storing a set of machine language instructions executable by said parallel processor;
  (ii) a first routine stored in said memory and executable by said parallel processor for generating a control mask having a plurality of mask bits that indicate whether to exchange the keys in each of a plurality of pairs of said keys, said first routine initiating a control vector equal to 0, 1, 0, 1, . . . , 0, 1, initiating a control mask equal to 0, 1, 0, 1, . . . , 0, 1, and, for m repetitions, modifying said control mask by XORing said control mask with said control vector and shuffling said control mask;
  (iii) a second routine stored in said memory and executable by said parallel processor for applying a compare-exchange operation to each pair of said keys and thereby exchanging said keys in each pair to the extent indicated by said mask bits; and
  (iv) a third routine stored in said memory and executable by said processor for performing the following for m−1 repetitions, each repetition defining a repetition number x:
    (a) shuffling said control vector,
    (b) modifying said control mask by XORing said control mask with said control vector,
    (c) for m−1−x, shuffling said keys and shuffling said control mask, and
    (d) for two repetitions, shuffling said keys, shuffling said control mask, and applying a compare-exchange operation to said keys.

12. A computer readable medium having instructions stored thereon for causing a computer to perform a method for sorting a data set of $2^m$ keys in a parallel processing structure, wherein m is a nonzero positive integer, said parallel processing structure comprising, in combination, a computer system having operative units configured to simultaneously perform a plurality of data operations, and a memory shared by each of said operative units, said method comprising:
  (a) generating a control mask having a plurality of mask bits indicating whether to exchange said keys in each of a plurality of pairs of said keys;
  (b) applying a compare-exchange operation to each pair of said keys in a 1-apart permutation, to exchange said keys in each pair to the extent indicated by said mask bits;
  (c) updating said control mask;
  (d) for a first number of repetitions:
    (i) redundantly shuffling said keys, and
    (ii) redundantly shuffling said control mask; and
  (e) for a second number of repetitions:
    (i) shuffling said keys,
    (ii) shuffling said control mask, and
    (iii) applying said compare-exchange operation to a plurality of pairs of said keys, to exchange said keys in each pair as indicated by said mask bits.

13. A computer readable medium having instructions stored thereon for causing a computer to perform a method for sorting a data set of $2^m$ keys in a parallel processing structure, said parallel processing structure comprising, in combination, a computer system having operative units configured to simultaneously perform a plurality of data operations, and a memory shared by each of said operative units, said method comprising:
  (i) generating a control mask having a plurality of mask bits that indicate whether to exchange said keys in each of a plurality of pairs of said keys:
    (a) initiating a control vector equal to 0, 1, 0, 1, . . . , 0, 1,
    (b) initiating a control mask equal to 0, 1, 0, 1, . . . , 0, 1, and
    (c) for m repetitions, modifying said control mask by XORing said control mask with said control vector and shuffling said control mask;
  (ii) applying a compare-exchange operation to each pair of said keys to exchange said keys in each pair as indicated by said mask bits; and
  (iii) performing the following for m−1 repetitions, each repetition defining a repetition number x:
    (a) shuffling said control vector,
    (b) modifying said control mask by XORing said control mask with said control vector,
    (c) for m−1−x repetitions, shuffling said keys and shuffling said control mask, and
    (d) for two repetitions, shuffling said keys, shuffling said control mask, and applying a compare-exchange operation to said keys.

\* \* \* \* \*